United States Patent [19]

Sako

[11] Patent Number: 5,732,088
[45] Date of Patent: Mar. 24, 1998

[54] DATA RECORDING/REPRODUCING APPARATUS, METHOD THEREOF, AND DATA RECORD MEDIUM

[75] Inventor: Yoichiro Sako, Chiba, Japan

[73] Assignee: Sony Corporation, Tokyo, Japan

[21] Appl. No.: 658,848

[22] Filed: May 31, 1996

[30] Foreign Application Priority Data

May 31, 1995 [JP] Japan ................... 7-156785

[51] Int. Cl.⁶ ............................................... G11B 20/18
[52] U.S. Cl. .................. 371/2.1; 369/275.3; 371/40.14
[58] Field of Search ........................ 371/2.1, 40.14; 369/275.3

[56] References Cited

U.S. PATENT DOCUMENTS 5,060,221  10/1991  Sako et al. ................................ 369/59
5,487,077  1/1996   Hassner ................................ 371/40.1

FOREIGN PATENT DOCUMENTS

| 0 342 833 A2 | 11/1989 | European Pat. Off. | G11B 20/18 |
| 0421871 A2 | 4/1991 | European Pat. Off. | G11B 20/12 |
| 0 449 213 A2 | 10/1991 | European Pat. Off. | G11B 20/18 |
| 0 569 716 A2 | 11/1993 | European Pat. Off. | G11B 20/18 |
| 0613136 A2 | 8/1994 | European Pat. Off. | G11B 20/12 |
| 2 264 387 A | 8/1993 | United Kingdom | G11B 20/18 |

*Primary Examiner*—Stephen M. Baker
*Attorney, Agent, or Firm*—Limbach & Limbach LLP

[57] ABSTRACT

A digital data recording apparatus for recording digital data on a record medium is disclosed, that comprises an interleave means for interleaving the digital data with a first interleave length or a second interleave length that is larger than the first interleave length and forming interleaved digital data depending on whether record density information that represents the record density of the digital data on the record medium represents a first record density or a second record density that is larger than the first record density, respectively, and recording means for recording the interleaved digital data on the record medium.

22 Claims, 10 Drawing Sheets

DATA RECORDING/REPRODUCING APPARATUS, METHOD THEREOF, AND DATA RECORD MEDIUM

BACKGROUND OF THE INVENTION

1. Field of the Invention

The present invention relates to a data recording/reproducing apparatus for allowing a signal process for data record mediums with different formats, in particular, for data record mediums with different data sizes to be simplified, a method thereof, and a data record medium.

2. Description of Related Art

As external storing units for use with computers, from view points of large storage capacity and high speed access, optical disc drives are becoming popular. CD-ROM (or CD-I (CD interactive)) drives and MO (magneto-optical disc) drives have been rapidly and widely used. An MO disc is one type of erasable discs. In addition, an MD (mini-disc) that is an erasable type disc has been proposed. Moreover, as a picture record medium, a DVD (digital video disc) is now under development.

The DVD is a reproduction-only disc with the same diameter as the diameter of the CD or a recordable/reproducible optical disc that is an MO type disc or a phase change type disc that reproduces or records/reproduces picture information compressed corresponding to the MPEG standard or the like. As the wavelength of laser rays decreases and the NA of an objective lens increases, the digital modulation and the error-correction-code encoding process have been improved, and the recording density has been further improved. In the case that the DVD is a single layer type disc, the data storage capacity is as much as around 3.7 Gbytes. The CD and MD were originally developed for digital audio discs. Thereafter, these discs have been used for external storage mediums for computers. Likewise, the DVD with much larger storage capacity than the CD and MD are expected to be used for external storage mediums for computers.

As with the DVD, the density of record mediums increase due to advancement of technologies. When a desired level of the recording density is accomplished, a new record medium and a new recording/reproducing apparatus are developed. When the same signal format as the conventional record mediums is used for the new record medium so as to maintain their compatibility, the number of bytes of a data error due to a defect (rubbish, scratch, etc.) on the medium increases, thereby deteriorating the reliability thereof.

In the conventional optical discs such as CDs, assuming that the wave length of laser rays is 635 nm and the NA of the objective lens is 0.52, a line density of around 0.3 μm/bit can be accomplished. In this case, the track pitch is, for example, 0.84 μm. On the other hand, in a high density type optical disc that will be commercially used in the near future, assuming that the wave length of the laser rays (blue laser) is 440 nm and the NA of the objective lens is 0.6, the line density of around 0.18 μm/bit can be accomplished. In other words, the length of one bit on the disc medium is decreased to around 60%. Thus, a defect of a medium for 500 bytes on the conventional optical disc becomes a defect for 833 bytes on a high density type optical disc. Consequently, the burst error length increases instead of an increase of the error rate.

It is possible for high density type optical discs to use an error-correction-code encoding process and a recording/reproducing signal format that are different from those of the conventional optical discs. However, in this case, hardware should be newly developed and designed. In addition, the compatibility between the conventional discs and the high density type optical discs is lost.

Therefore, an object of the present invention is to provide a data recording/reproducing apparatus for recording/reproducing data with different record densities of a plurality of data record mediums such as conventional data record mediums and high density type data record mediums without tradeoffs of an increase of hardware scale and a decrease of accessibility, a method thereof, and an accessible disc medium.

SUMMARY OF THE INVENTION

To accomplish the above-described object, a first aspect of the present invention is a digital data recording apparatus for recording digital data on a record medium, comprising an interleave means for interleaving the digital data with a first interleave length or a second interleave length that is larger than the first interleave length and forming interleaved digital data depending on whether record density information that represents the record density of the digital data on the record medium represents a first record density or a second record density that is larger than the first record density, respectively, and a recording means for recording the interleaved digital data on the record medium.

A second aspect of the present invention is a digital data reproducing apparatus, comprising a reading means for reading interleaved digital data from a record medium, a record density detecting means for detecting the record density of the interleaved digital data and generating record density information, and a deinterleave means for deinterleaving the interleaved digital data with a first interleave length or a second interleave length that is larger than the first interleave length and outputting digital data depending on whether the record density information represents a first record density or a second record density that is larger than the first record density, respectively.

A third-aspect of the present invention is a digital data recording method for recording digital data on a record medium, comprising the steps of interleaving the digital data with a first interleave length or a second interleave length that is larger than the first interleave length and forming interleaved digital data depending on whether record density information that represents the record density of the digital data on the record medium represents a first record density or a second record density that is larger than the first record density, respectively, and recording the interleaved digital data on the record medium.

A fourth aspect of the present invention is a digital data reproducing method, comprising the steps of reading interleaved digital data from a record medium, detecting the record density of the interleaved digital data and generating record density information, and deinterleaving the interleaved digital data with a first interleave length or a second interleave length that is larger than the first interleave length and outputting digital data depending on whether the record density information represents a first record density or a second record density that is larger than the first record density, respectively.

A fifth aspect of the present invention is a digital data recording apparatus, comprising an error-correction-code encoding means for error-correction-code encoding digital data for every block with a first data amount or a second data amount that is larger than the first data amount and forming error-correction-code encoded digital data depending on whether record density information that represents the record density of the digital data of a record medium represents a first record density or a second record density that is larger than the first record density, respectively, and a recording means for recording the error-correction-code encoded digital data on the record medium.

A sixth aspect of the present invention is a digital data reproducing apparatus, comprising a reading means for reading error-correction-code encoded digital data from a record medium, and an error-correction-code decoding means for error-correction-code decoding the error-correction-code encoded data for every block with a first data amount or a second data amount that is larger than the first data amount and outputting digital data depending on whether record density information that represents the record density of the error-correction-code encoded digital data represents a first record density or a second record density that is larger than the first record density, respectively.

A seventh aspect of the present invention is a digital data recording method, comprising the steps of error-correction-code encoding digital data for every block with a first data amount or a second data amount that is larger than the first data amount and forming error-correction-code encoded digital data depending on whether record density information that represents the record density of the digital data of a record medium represents a first record density or a second record density that is larger than the first record density, respectively, and recording the error-correction-code encoded digital data on the record medium.

An eighth aspect of the present invention is a digital data reproducing method, comprising the steps of reading error-correction-code encoded digital data from a record medium, and error-correction-code decoding the error-correction-code encoded data for every block with a first data amount or a second data amount that is larger than the first data amount and outputting digital data depending on whether record density information that represents the record density of the error-correction-code encoded digital data represents a first record density or a second record density that is larger than the first record density, respectively.

A ninth aspect of the present invention is a disc shaped record medium that has a plurality of record tracks and that is rotated at a constant angular velocity when the tracks are accessed, the record medium including first record tracks that record first digital data interleaved with a first interleave length, and second record tracks that record second digital data interleaved with a second interleave length larger than the first interleave length and that is disposed on a more inner peripheral side than the first record tracks.

A tenth aspect of the present invention is a disc shaped record medium that has a plurality of record tracks and that is rotated at a constant angular velocity when the tracks are accessed, the record medium including first record tracks that record first digital data error-correction-code encoded for every block with a first data amount, and second record tracks that record second digital data error-correction-code encoded for every block with a second data amount larger than the first data amount and that is disposed on a more inner peripheral side than the first record tracks.

An eleventh aspect of the present invention is a disc shaped record medium having at least two divided record regions as a first record region and a second record region defined as positions in a radial direction, wherein the first record region has recorded therein first digital data interleaved with a first interleave length, and wherein the second record region has recorded therein second digital data interleaved with a second interleave length larger than the first interleave length and that is disposed on a more inner peripheral side than the first record region.

A twelfth aspect of the present invention is a disc shaped record medium having at least two divided record regions as a first record region and a second record region defined as positions in a radial direction, wherein the first record region has recorded therein first digital data error-correction-code encoded for every block with a first data amount, and wherein the second record region that records second digital data error-correction-code encoded for every block with a second data amount larger than the first data amount and that is disposed on a more inner peripheral side than the first record region.

These and other objects, features and advantages of the present invention will become more apparent in light of the following detailed description of best mode embodiments thereof, as illustrated in the accompanying drawings.

DETAILED DESCRIPTION OF PREFERRED EMBODIMENTS

Figure 1:
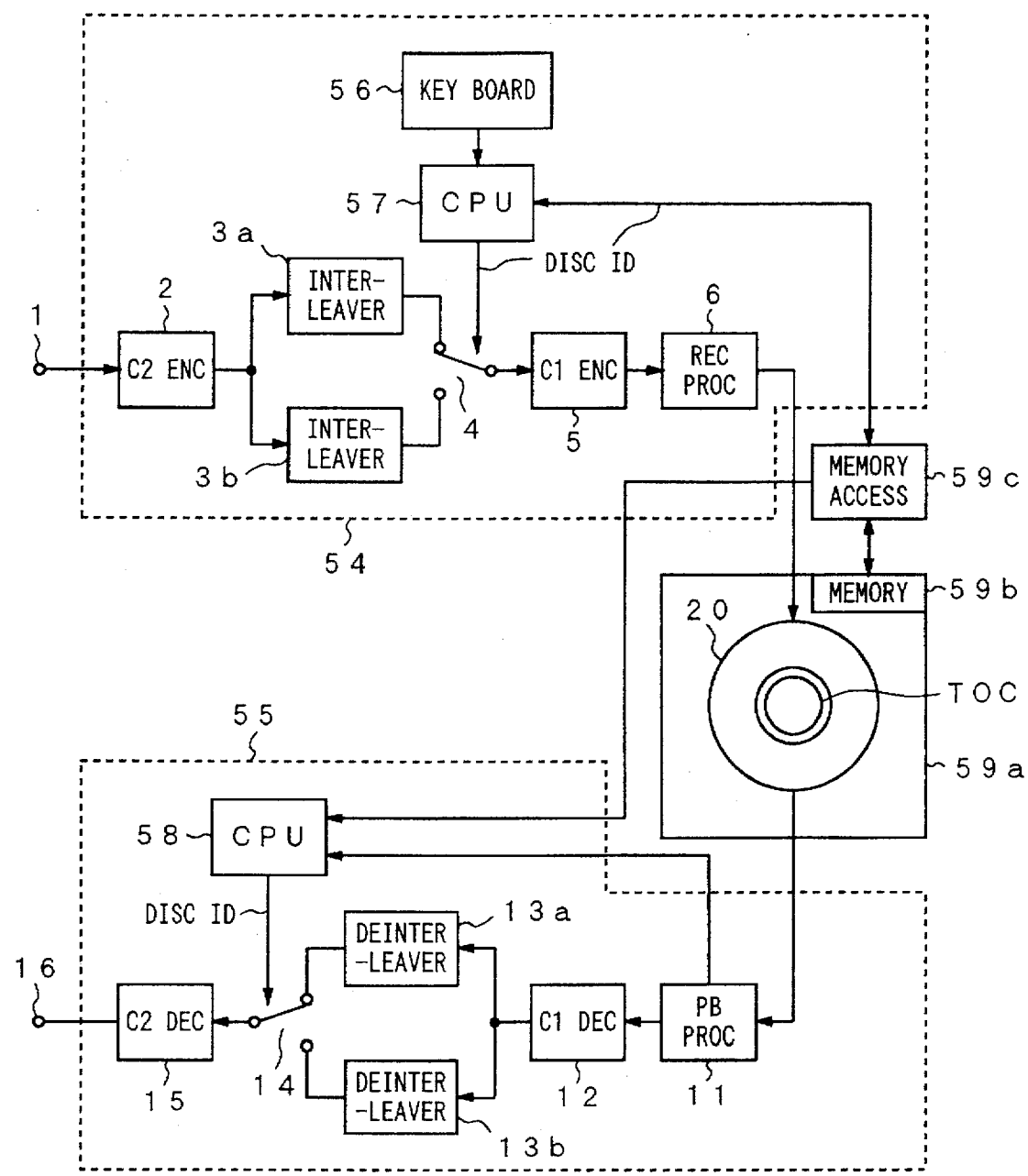
FIG. 1 is a block diagram showing the overall structure of a recording/reproducing circuit according to an embodiment of the present invention.

Next, with reference to the accompanying drawings, an embodiment of the present invention will be described. FIG.

1 schematically shows a structure of an optical disc recording/reproducing system according to an embodiment of the present invention. The system is composed of an optical disc recording system and an optical disc reproducing system. Digital data (namely computer data) to be recorded is supplied from an input terminal 1. The input digital data is divided into sectors. A sector is a unit of data to be recorded/reproduced. If necessary, a data sync and a header are added to each sector.

The input digital data is supplied to an error-correction-code encoder. In this example, a folding type dual code such as the CIRC (cross interleave Reed-Solomon code) is used as an error correction code. The encoder is composed of a C2 encoder 2, interleavers 3a and 3b, a selecting circuit 4, and a C1 encoder 5. In this encoder, the C2 encoder 2 performs an error-correction-code encoding process for a plurality of data symbols. The interleaver 3a or 3b changes data symbols and a code sequence of the parity generated by the C2 encoder. The C1 encoder 5 encodes the resultant symbols of which the code sequence has been changed.

The output data, which has been encoded with the error correction code, is supplied to a record processing circuit 6. Record data that is output from the record processing circuit 6 is supplied to an optical pickup through a drive circuit (they are not shown) and then recorded on an optical disc 20. The disc 20 has a TOC region in which TOC (Table Of Contents) information is recorded. In the TOC region, a disc ID (that will be described later) is recorded. A cartridge 59a houses and protects the disc 20. The cartridge 59a has a semiconductor memory 59b that may store the disc ID. As examples of the optical disc 20, a WO (write once) type optical disc, an MO, and a phase-change type recordable/ reproducible optical disc are used. It should be noted that the present invention can be applied for a mastering system of a reproduction-only disc such as a CD-ROM as well as a drive device for the optical disc 20. According to the embodiment of the present invention, as the optical disc 20, one of two types of discs with different record densities can be selected. Alternatively, the embodiment can be applied for a high density type optical disc that will be used in future as well as the conventional discs.

Reproduction data read from the optical disc 20 is supplied to a reproduction processing circuit 11 through a reproducing amplifier and a clock extracting circuit or the like (not shown). In addition, a focus servo, a tracking servo, and a feed servo are provided for the optical pickup. Moreover, a spindle motor servo is provided for driving the optical disc at CAV (Constant Angular Velocity) or CLV (Constant Linear Velocity). Furthermore, a circuit that controls laser power is provided. Since these portions are the same as those of the conventional circuit structure, the description for these portions is omitted.

An error-correction-code decoder is connected to the reproduction processing circuit 11. This decoder is composed of a C1 decoder 12, deinterleavers 13a and 13b, a selecting circuit 14, and a C2 decoder 15. The C2 decoder 15 supplies the reproduction data of the optical disc 20 to an output terminal 16.

The two interleavers 3a and 3b are provided for selecting the interleave length corresponding to the record density of the optical disc 20. The structure other than the interleavers 3a and 3b is the same regardless of the record density of the optical disc 20. Thus, the data format of data recorded on the optical disc 20 and the data format of data reproduced therefrom do not depend on the record density of the disc. For example, as with the format of a CD, a sub-code, data, a parity P of a C1 code, and a parity Q of a C2 code are placed in one transmission frame (also referred to as an EFM frame or a C1 frame). These data parts are digitally modulated. At the beginning of each transmission frame, a sync (a sync signal) is placed.

Figure 2:
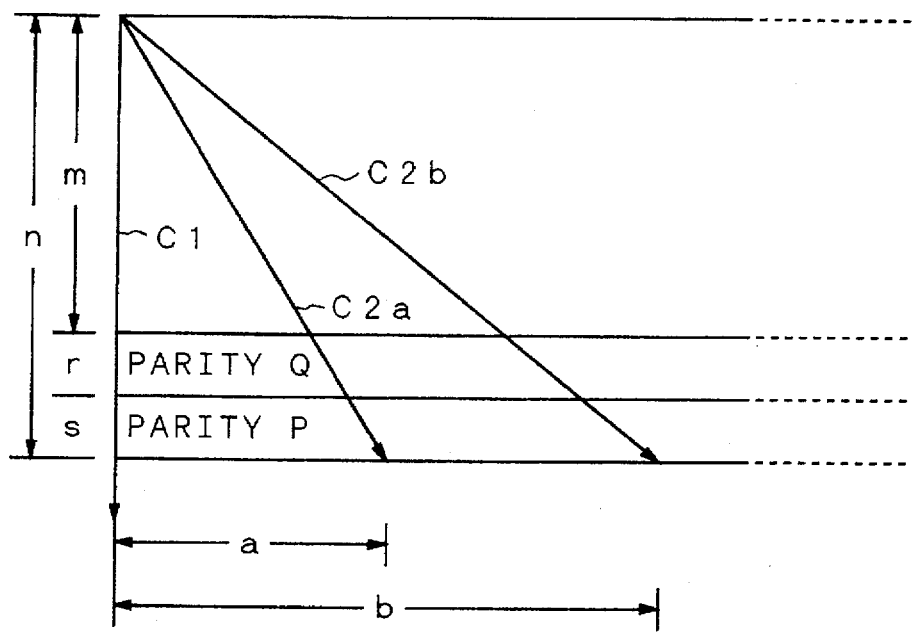
FIG. 2 is a schematic diagram for explaining an error-correction-code encoding process according to the embodiment of the present invention.

Next, with reference to FIG. 2, the error-correction-code encoding process according to the embodiment of the present invention will be described. In FIG. 2, m symbols are data to be encoded with an error correction code. r symbols are the parity Q. s symbols are the parity P. The encoding process with the error correction code C1 is performed for m data symbols disposed in parallel (at the same timing) and for r data symbols of the parity Q. Thus, the parity P of s data symbols is generated. On the other hand, the encoding process with the error correction code C2 is performed for data symbols disposed along a diagonal line. Thus, the parity Q is generated.

The interleaver 3a is selected when the optical disc 20 is a standard record density type optical disc. In FIG. 2, a code sequence represented by C2a is formed. On the other hand, the interleaver 3b is selected when the optical disc is a high density type optical disc. In FIG. 2, a code sequence represented by C2b is formed. Generally, the maximum delay amount in the interleaving process is referred to as an interleave length (also referred to as the restriction length of the interleave, the depth of the interleave, or the interleave interval). As is clear from FIG. 2, the relation between the interleave length for a standard record density type optical disc and the interleave length b for a high density type optical disc is expressed by b>a.

With information in association with the input digital data, data read from the semiconductor memory 59b, or a key operation of a keyboard 56 of the user, a disc ID is generated by a CPU 57. The selecting circuit 4 is controlled corresponding to the disc ID. Thus, the interleaver 3a or 3b corresponding to the record density of the optical disc 20 is selected. Alternatively, with reflected light of the disc, the reflecting ratio is detected and a disc ID is generated. Thus, the interleaver 3a or 3b can be automatically selected. When the semiconductor memory 59b does not store a disc ID, the generated disc ID may be stored in the semiconductor memory 59b. The relation of the interleave lengths (b>a) is defined because the performance of the burst error-correction is proportional to the interleave length. As described above, the burst error length due to a defect such as a scratch of a high density type optical disc tends to be larger than that of a standard record density type optical disc.

Thus, it is defined that the interleave length b of the high density type optical disc is larger than the interleave length a of the standard density type optical disc. On the other hand, the length of a region for prohibiting data from being recorded is proportional to the interleave length. Thus, the substantial record density decreases. Consequently, it is defined that the interleave length a of the standard density type optical disc is smaller than the interleave length b of the high density type optical disc.

In an optical disc reproducing system 55, in the reverse order of an optical disc recording system 54, an error correcting process is performed with the C1 code. Thereafter, a deinterleaving process for offsetting the interleaving process on the record side is performed. After that, an error correcting process with the C2 code is performed. When the optical disc 20 is a standard density type optical disc, the deinterleaver 13 is selected. When the optical disc 20 is a high density type optical disk, the deinterleaver 13b is selected. The disc ID for controlling the selecting circuit 4 is recorded in the CPU 58 along with the directory information and so forth before data is reproduced from the optical disc 20. Thus, the relevant interleaver is automatically selected.

When a disc ID has been stored in the semiconductor memory 59b, the disc ID is read by a memory access circuit 59c and thereby the proper interleaver is automatically selected.

In this example, the CPU 57 of the recording system and the CPU 58 of the reproducing system are independently disposed. However, one CPU may be shared by the recording system and the reproducing system.

Figure 3:
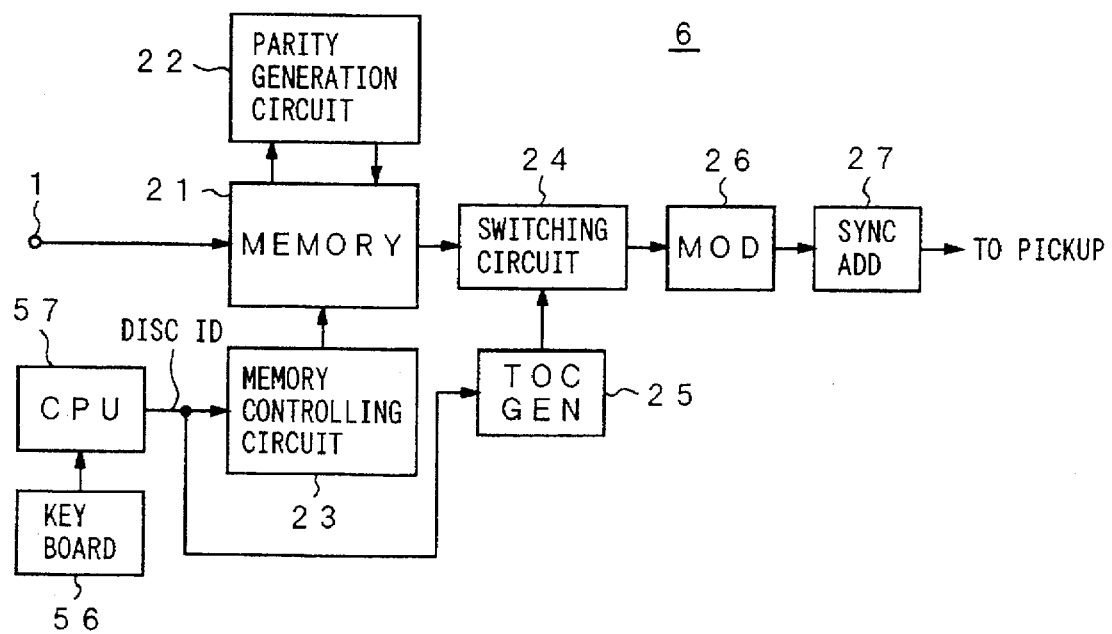
FIG. 3 is a block diagram showing an example of a record processing system shown in FIG. 1.

Next, with reference to FIG. 3, an example of the optical disc recording system 54 shown in FIG. 1 will be described. Formatted data is written in a semiconductor memory (RAM) 21. In association with the memory 21, a parity generating circuit 22 and a memory controlling circuit 23 are disposed so as to generate the parities P and Q of the error correction code. Data with the parities is supplied to a digital modulating circuit 26 through a switching circuit 24. The switching circuit 24 selects the error-correction encoded output or TOC data received from a TOC data generating circuit 25 and sends the selected data to a digital modulating circuit 26.

Disc ID is supplied to the memory controlling circuit 23 and the TOC data generating circuit 25. The memory 21, the parity generating circuit 22, and the memory controlling circuit 23 composes the error-correction-code encoder (the C2 encode 2, the interleavers 3a and 3b, the selecting circuit 4, and the C1 encoder 5) shown in FIG. 1. In other words, the data write operation to the memory 21 and the data read operation from the memory 21 are controlled by the memory controlling circuit 23. Thus, the interleaving process can be accomplished. By switching the control of the memory 21 corresponding to the disc ID, the two interleaving processes can be performed. In reality, as described above, the interleave length a of which, data is recorded on a standard density type optical disc is larger than the interleave length b of which data is recorded on a high density type optical disc.

The digital modulating circuit 26 maps a data symbol of, for example, one byte (eight bits) to a code word of 16 bits corresponding to a predetermined table so as to generate a modulated output with a small DC component. Of course, the EFM method for CDs, the 8–15 modulating method for converting a data symbol of eight bits into a code word of 15 bits, or the like can be used for the digital modulating method. The output of the digital modulating circuit 28 is supplied to a sync adding circuit 27. The sync adding circuit 27 adds an additional sync, a C1 sync, a sector sync, and the like to the modulated data. The output of the sync adding circuit 27 is supplied to an optical pickup through a drive circuit and then recorded on the optical disc 20. These syncs have a special bit pattern so that they are not present in modulated data.

Figure 4:
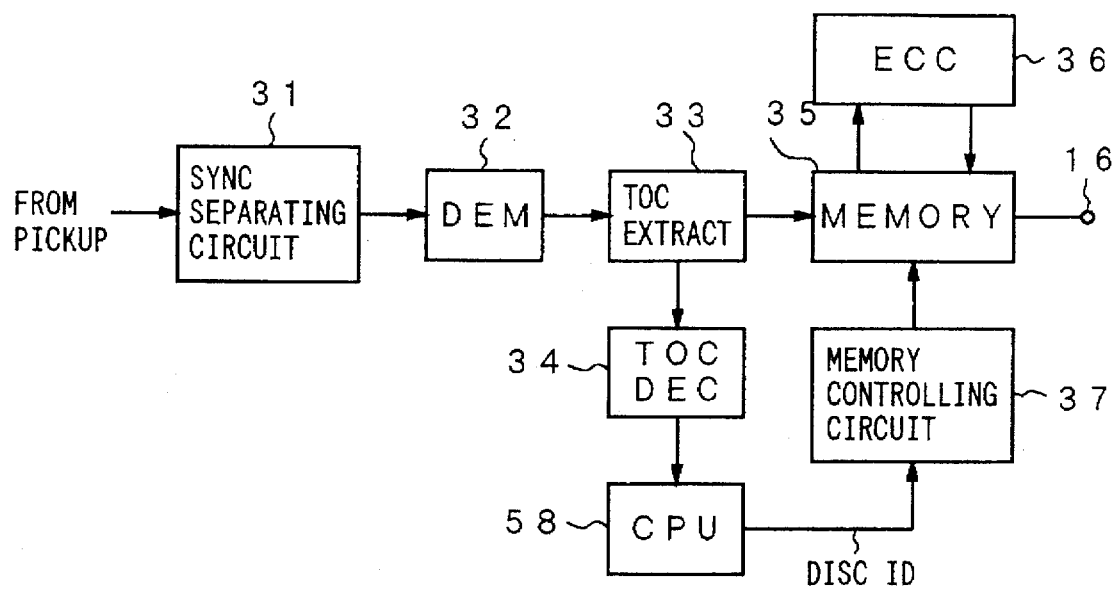
FIG. 4 is a block diagram showing an example of a reproduction processing system shown in FIG. 1.

FIG. 4 is a block diagram showing an example of the optical disc reproducing system 55. The reproduction data is supplied to a sync separating circuit 31. A sync detection signal (not shown) corresponding to a sync is generated by the sync separating circuit 31. The sync detection signal is supplied to a timing generating circuit. The timing generating circuit generates various timing signals such as sector pulses that synchronize with the reproduction data.

A digital demodulating circuit 23 is connected to the sync separating circuit 31. In the reverse process of the digital modulating circuit 26, the modulating circuit 32 generates data of which a code word has been restored to a data symbol. The output data of the digital demodulating circuit 32 is written to a semiconductor memory (RAM) 35 through a TOC extracting circuit 33. The TOC extracting circuit 33 extracts TOC data that was read when the disc was loaded. The extracted TOC data is supplied to a TOC decoder 34. The TOC decoder 34 decodes the TOC data and outputs various control information such as the disc ID to the CPU 58.

The memory 35 is connected to an error correcting circuit 36 and a memory controlling circuit 37. The error correcting circuit 36 corrects an error of the reproduction data. The disc ID that is output from the TOC decoder 34 is supplied to a memory controlling circuit 37 through the CPU 58. Data that is read from the memory 35 and that has been error corrected is obtained from the output terminal 16.

The memory 35, the error correcting circuit 36, and the memory controlling circuit 37 compose the error-correction-code decoder (the C1 decoder 12, the deinterleavers 13a and 13b, the selecting circuit 14, and the C2 decoder 15). In other words, the data write operation to the memory 35 and the data read operation from the memory 35 are controlled by the memory controlling circuit 37. Thus, the deinterleaving process can be accomplished. The control operation of the memory 35 is switched corresponding to the disc ID that is output from the TOC decoder 34 through the CPU 58. Thus, the two deinterleaving processes corresponding to a standard density type optical disc and a high density type optical disc can be performed.

Figure 5:
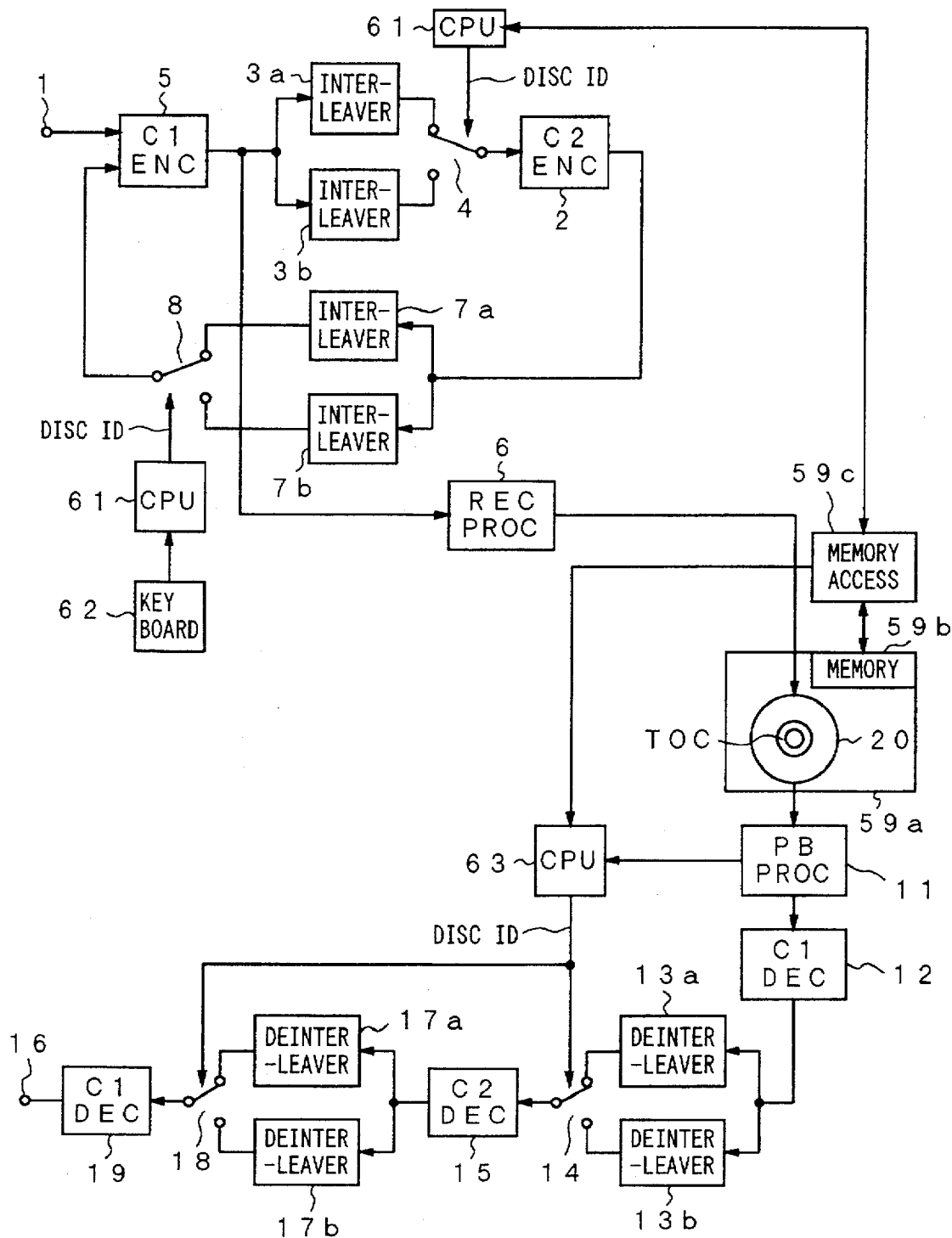
FIG. 5 is a block diagram showing an overall structure of a recording/reproducing circuit according to a second embodiment of the present invention.

FIG. 5 is a block diagram schematically showing another (second) embodiment of the present invention. As with the first embodiment, according to the second embodiment, the folding type dual code encoding process is used. However, the difference between these embodiments is in that according to the second embodiment, a feed-back type encoding process is used. In the feed-back type encoding process, the C1 encoding process encodes not only data symbols but the parity Q. In addition, the C2 encoding process encodes not only data symbols but the parity P.

As shown in FIG. 5, the C1 encoder 5 encodes data symbols received from an input terminal 1 and the parity Q received from a selecting circuit 8. The C1 encoder 5 outputs encoded output data (the data symbols, and the parities P and Q). In addition, the output (the data symbols and the parity P) of the C1 encoder 5 is supplied to a C2 encoder 2 through interleavers 3a and 3b and a selecting circuit 4. Thus, the C2 encoder 2 encodes the data with the C2 code. The encoded output (the data symbols and the parity Q) of the C2 encoder 2 is supplied to the C1 encoder 5 through interleavers 7a and 7b and a selecting circuit 8.

In the feed-back type dual code encoding process, when the optical disc 20 is a standard density type optical disc, data that represents the optical disc 20 which is a standard density type optical disc is input from the keyboard 62 by the user. Thus, the interleavers 3a and 7a are selected corresponding to the disc ID generated by the CPU 61. On the other hand, when the optical disc 20 is a high density type optical disc, data that represents the optical disc 20 which is a high density type optical disc is input from the keyboard 62 by the user. Thus, the interleavers 3b and 7b are selected corresponding to the disc ID generated by the CPU 61. As with the first embodiment, in the second embodiment, it is defined that the interleave length b for a high density type optical disc is larger than the interleave length a for a standard density type optical disc. Thus, in the second embodiment, data can be recorded/reproduced with a high reliability. When the semiconductor memory 59b has stored a disc ID, the disc ID is read by the memory access circuit 59c. Thus, the corresponding interleavers 3a and 7a or 3b and 7b are automatically selected.

The error-correction-code decoder disposed on the reproduction side is composed of the C1 decoder 12, the deinterleavers 13a and 13b, the selecting circuit 14, the C2 decoder 15, the deinterleavers 17a and 17b, the selecting circuit 18, and the C1 decoder 19. The deinterleavers 13a and 17a are provided for a standard density type optical disc. In contrast, the deinterleavers 13b and 17b are provided for a high density type optical disc. In the feed-back type process, the C1 decoding process, the C2 decoding process, and the C1 decoding process are successively performed so as to effectively correct an error.

Figure 6:
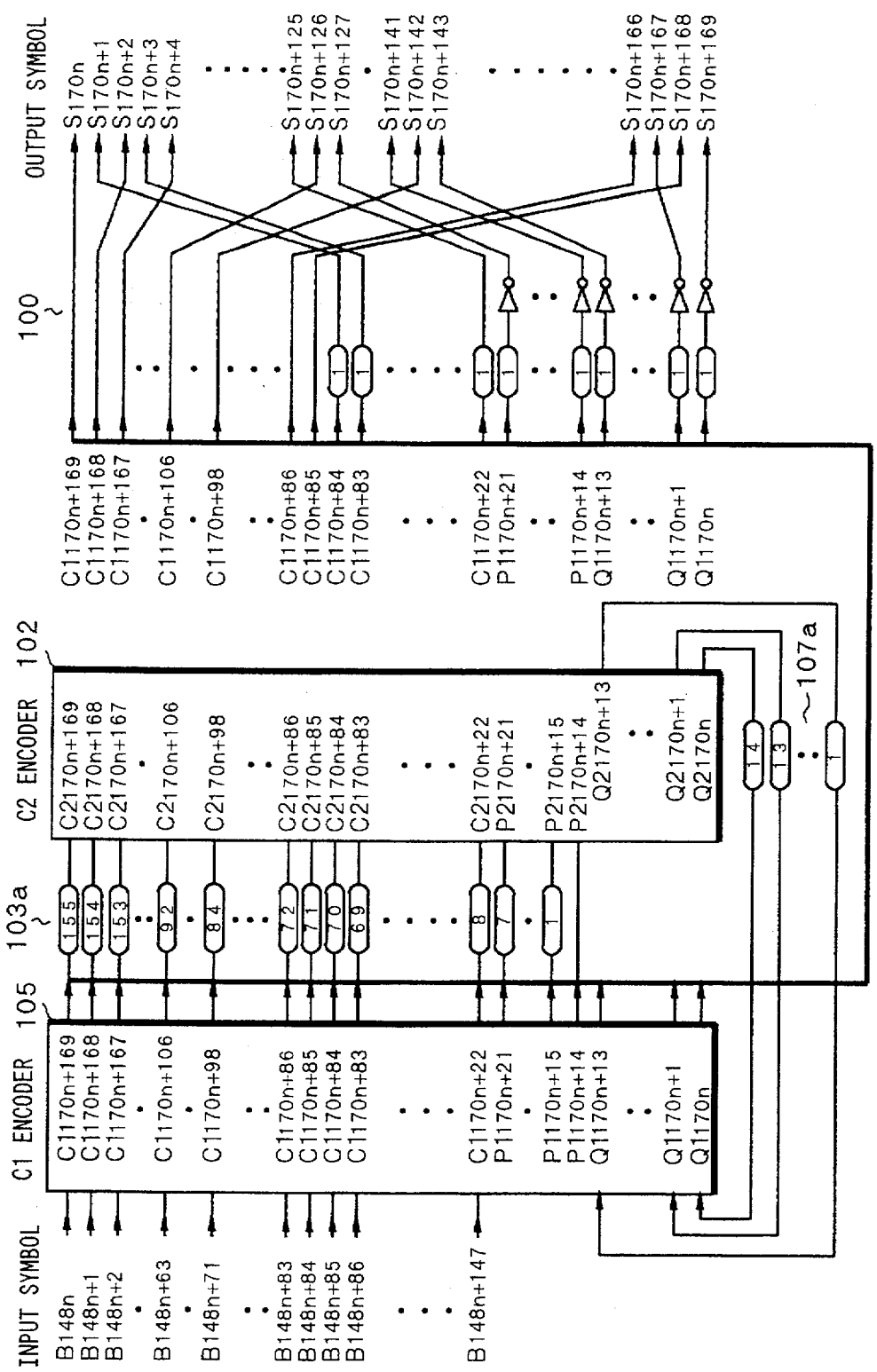
FIG. 6 is a schematic diagram showing a real example of an error-correction-code encoding process according to the second embodiment of the present invention.

Next, the error-correction encoding process according to the second embodiment, namely, feed-back folding type dual code encoding process will be described with a real example. FIG. 6 is a block diagram showing an error-correction-code encoding process in which data is recorded on a standard density type optical disc. Input symbols of 148 bytes are supplied to a C1 encoder 105. The output (data symbols of 148 bytes and C1 parity P of eight bytes) is supplied to a C2 encoder 102 through a delay circuit group 103a for the interleaving process.

The C2 encoder 102 generates a C2 parity Q of 14 bytes with a [170, 156, 15] Reed-Solomon code. The C1 encoder 105 encodes not only data, but the C2 parity with the C1 code. Thus, the C2 parity Q is fed-back from the C2 encoder 102 to the C1 encoder 105 through the delay circuit group 107a for the interleaving process. Consequently, the C1 encoder 105 encodes the input symbols with a [170, 102, 9] Reed-Solomon code. The delay circuit groups 103a and 107a compose the interleavers for a standard density type optical disc.

Output symbols of 170 bytes (data of 148 bytes, the C1 parity P of eight bytes, and the C2 parity Q of 14 bytes) are obtained from the C1 encoder 105 through an array changing circuit 100 including a delay circuit. The array changing circuit 100 is provided so as to widen the space of each adjacent symbol, thereby preventing a two-symbol error as an error at the boundary of symbols. The interleave length of the feed-back, folding type dual code encoding process is 170 frames that accord with the maximum delay amount of the delay circuit group 103a (where the frame has the length of the C1 code sequence).

Figure 7:
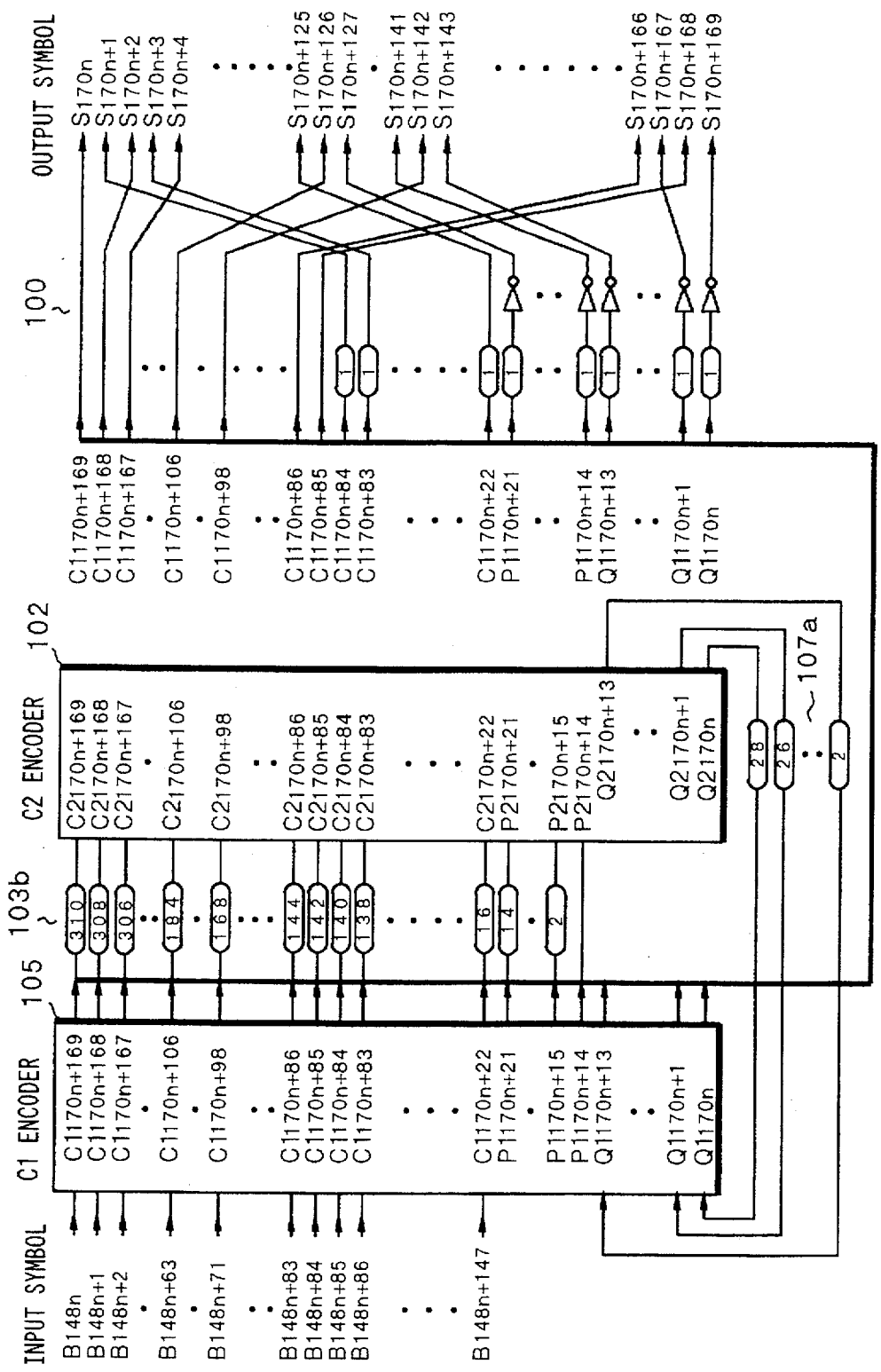
FIG. 7 is a schematic diagram showing a real example of an error-correction-code encoding process according to the second embodiment of the present invention.

As delay circuit groups 103b and 107b in FIG. 7, it is defined that the delay amount of each delay circuit for a high density type optical disc is twice that for a low density type optical disc. The other processes except for the interleaving process are the same as those shown in FIG. 6. Thus, the interleave length of the interleaving processes performed by the delay circuit groups 103b and 107b becomes 340 frames. Consequently, the interleave length for a high density type optical disc becomes twice that for a standard density type optical disc.

Figure 8:
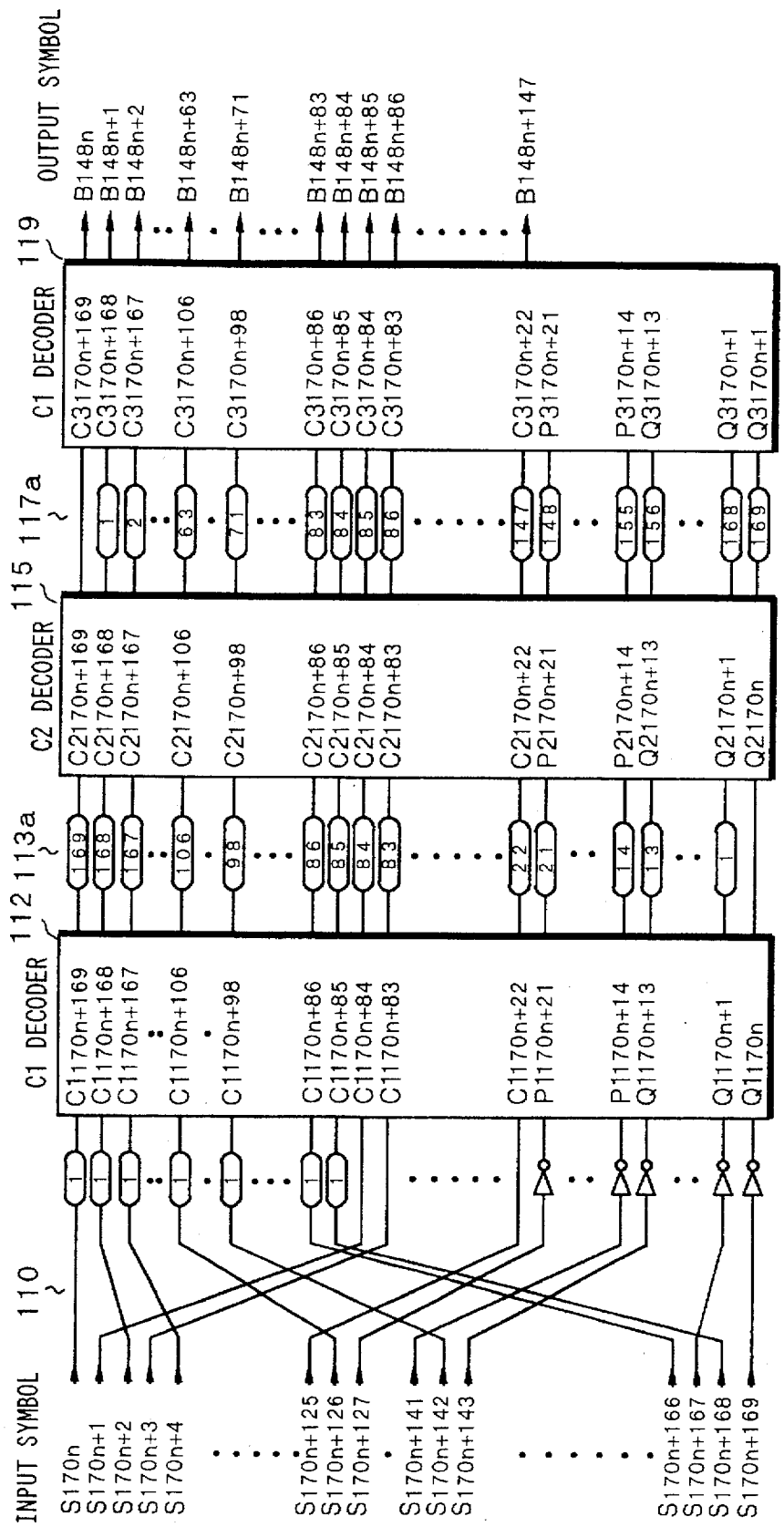
FIG. 8 is a schematic diagram showing a real example of an error-correction-code decoding process according to the second embodiment of the present invention.

Next, the process of the decoder corresponding to the encoder for a standard density type optical disc shown in FIG. 6 will be described with reference to FIG. 8. Input symbols (of 170 bytes) are supplied from the reproduction processing circuit to a C1 decoder 112 through an array changing circuit 110. The array changing circuit 110 performs the reverse process of the array changing circuit 100 of the encoder. The C1 decoder 112 decodes input symbols with the [170, 162, 9] Reed-Solomon code.

The output of the C1 decoder 112 is supplied to a C2 decoder 115 through a delay circuit group 113a for the deinterleaving process. The C2 decoder 115 decodes the input symbols with a [170, 156, 15] Reed-Solomon code. The decoded output of the C2 decoder 115 is supplied to a C1 decoder 119 through a delay circuit group 117a for the deinterleaving process. Thus, by the C1 decoding process, the C2 decoding process, and the C1 decoding process, data symbols of 148 bytes that have been error corrected can be obtained.

Figure 9:
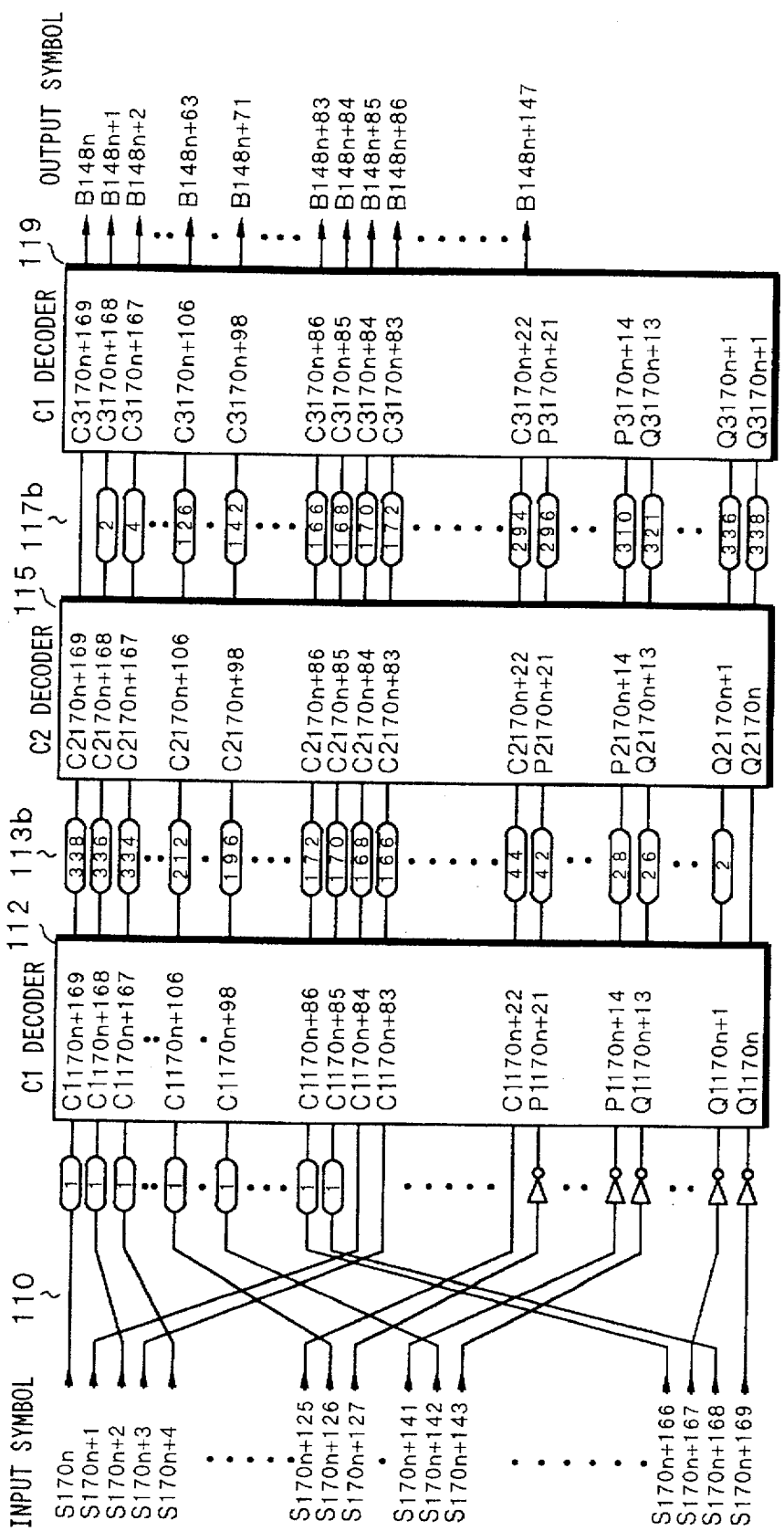
FIG. 9 is a schematic diagram showing a real example of an error-correction-code decoding process according to the second embodiment of the present invention.

FIG. 9 shows the process of a decoder corresponding to the encoder for a high density type optical disc shown in FIG. 7. It is defined that the delay amount of each delay circuit for the interleaving process in the encoder for a high density type optical disc is twice that for a standard density type optical disc. Thus, the delay amount of each delay circuit in the delay circuit groups 113b and 117b for the deinterleaving process for a high density type optical disc is twice that for a standard density type optical disc. The other processes except for the deinterleaving process are the same as those shown in FIG. 8.

In the above description, it is defined that the interleave length for a high density type optical disc is twice that for a standard density type optical disc. However, the present invention is not limited to the method for which the interleave length for a high density type optical disc is n times that for a standard density type optical disc (where n is an integer). Instead, when the delay amount for the interleaving process for a standard density type optical disc varies by a unit delay amount d as in d, 2d, 3d, ..., the delay amount for the interleaving process for a high density type optical disc can be varied with a difference of d and 2d as in 2d, 3d, 5d, 6d, 8d, and so on.

In addition to changing the interleave length, when an error-correction-code encoding process is performed for each block, the block size may be changed.

Figure 10:
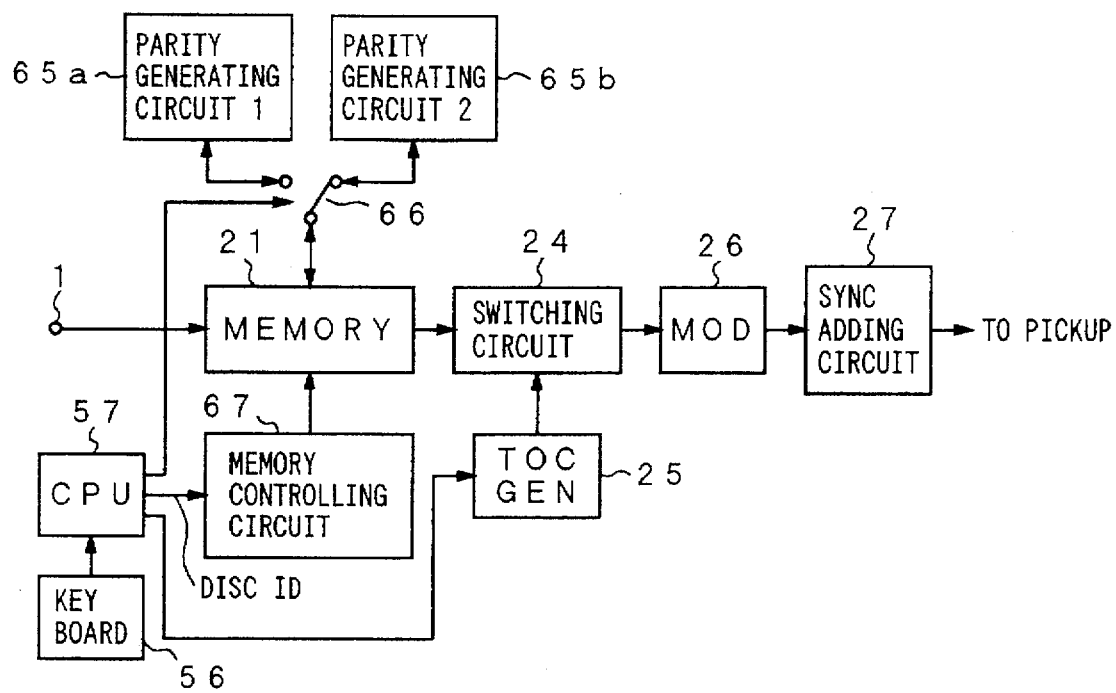
FIG. 10 is a block diagram showing an example of a record processing system according to a third embodiment of the present invention.

FIG. 10 shows an example of a recording system that changes a block size, performs an error-correction-code encoding process for the resultant blocks, and records the encoded data. For simplicity, in FIG. 10, similar portions to those in FIG. 3 are denoted by similar reference numerals.

In FIG. 10, formatted data is written to a semiconductor memory (RAM) 21.

In association with the memory 21, parity generating circuits 65a and 65b are disposed through a selecting circuit 66. A memory controlling circuit 67 is connected to the memory 21. The memory controlling circuit 67 controls the memory 21.

A disc ID generated by a CPU 57 corresponding to a key operation of a keyboard 56 by the user is supplied to the memory controlling circuit 67, a TOC generator 25, and the selecting circuit 66.

The selecting circuit 66 selects one of the parity generating circuits 65a and 65b corresponding to the disc ID and connects the selected parity generating circuit to the memory 21.

Figure 12A:
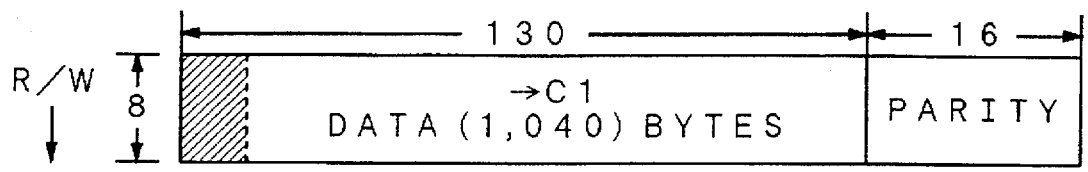
FIG. 12A is a schematic diagram showing a data block for explaining the third embodiment of the present invention.
Figure 12B:
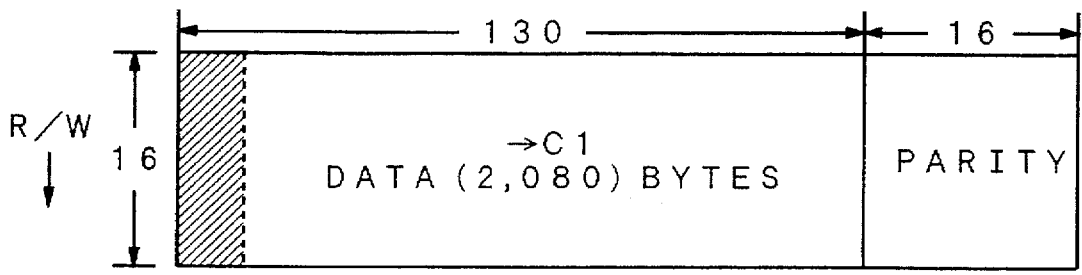
FIG. 12B is a schematic diagram showing a data block for explaining the third embodiment of the present invention.

When the parity generating circuit 65a is selected, a two-dimensional array of data symbols of [8×130=1040] bytes shown in FIG. 12A are encoded for every 130 bytes in the horizontal direction with a [146, 130, 17] Reed Solomon code. Thus, a parity of 16 bytes is generated. On the other hand, when the parity generating circuit 65b is selected, a two-dimensional array of data symbols of [16×130=2080] bytes shown in FIG. 12B are encoded for every 130 bytes in the horizontal direction with a [146, 130, 17] Reed Solomon code. Thus, a parity of 16 bytes is generated.

Since the memory controlling circuit 67 and the selecting circuit 66 are controlled corresponding to the disc ID, the size of data blocks to be encoded with the error correction code can be changed.

The data block with the parity shown in FIGS. 12A or 12B is supplied to a digital modulating circuit 26 through the switching circuit 24. The switching circuit 24 selects one of the error-correction-code encoded output data and the TOC data supplied from the TOC data generating circuit 25 and supplies the selected data to the digital modulating circuit 26.

The digital modulating circuit 26 maps a data symbol of, for example, 1 byte (8 bits) to a code word of 16 bits corresponding to a predetermined table and generates modulated data with a small DC component. Of course, the EFM method used for CDs, the 8–15 modulating method for converting a data symbol of 8 bits into a code word of 15 bits, or the like can be used for the digital modulating circuit. The output data of the digital modulating circuit 26 is supplied to a sync adding circuit 27. The output data of the sync adding circuit 27 is supplied to an optical pickup through a drive circuit and recorded on the optical disc 20. These syncs have a special bit pattern so that they are not present in modulated data.

Figure 11:
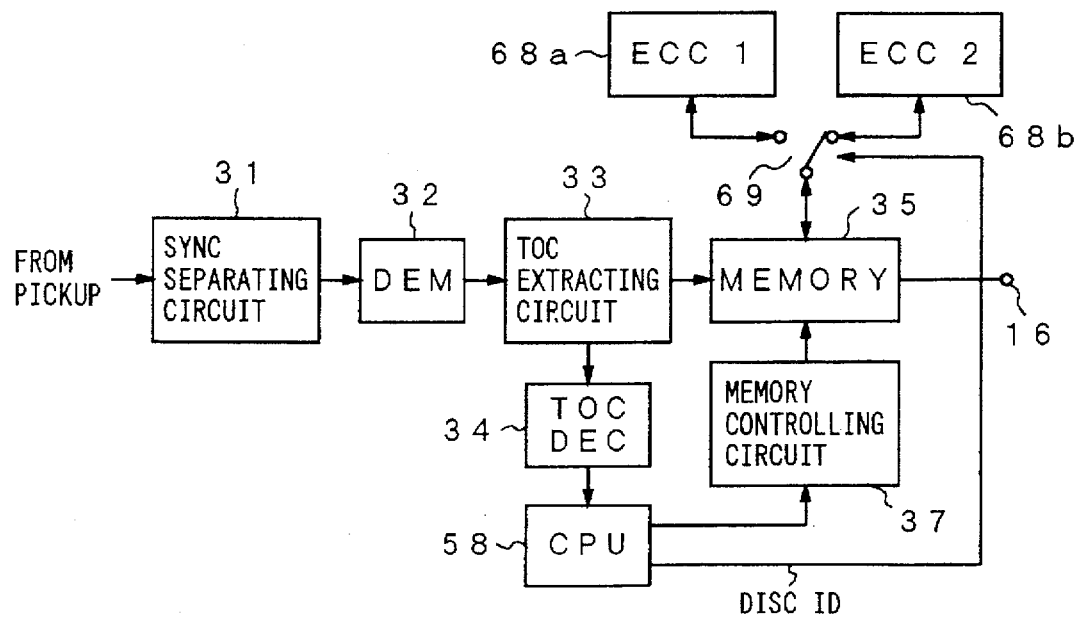
FIG. 11 is a block diagram showing an example of a reproduction processing system according to the fourth embodiment of the present invention.

FIG. 11 shows an example of a reproducing system that reproduces data of which the size of blocks was changed, an error-correction decoding process was performed for the resultant blocks, and the encoded data was recorded on a record medium. For simplicity, in FIG. 11, similar portions to those in FIG. 4 are denoted by similar reference numerals.

The reproduced data is supplied to a sync separating circuit 31. The sync separating circuit 31 generates sync detection signals (not shown) corresponding to syncs. The sync detection signals are supplied to a timing generating circuit. Various timing signals such as sector pulses are generated in synchronization with the reproduced data.

The sync separating circuit 31 is connected to a digital demodulating circuit 32. The digital demodulating circuit 32 restores a code word to a data symbol in the reverse process of the digital modulating circuit 26.

The output data of the digital demodulating circuit 32 is written to a semiconductor memory (RAM) 35 through a TOC extracting circuit 33. The TOC extracting circuit 33 extracts TOC data that was initially read when the disc was loaded. The extracted TOC data is supplied to a TOC decoder 34. The TOC decoder 34 decodes the TOC data and supplies the resultant various data (including a disc ID) to a CPU 58.

The memory 35 is connected to a memory controlling circuit 37. In addition, the memory 35 is connected to an error correcting circuit 68a or 68b through a selecting circuit 69. The selecting circuit 69 connects one of the error correcting circuit 68a and 68b to the memory 35 corresponding to the disc ID supplied from the CPU 58.

When the error correcting circuit 68a is selected, a two-dimensional array of data symbols of [8×130=1040] bytes shown in FIG. 12A are encoded for every 130 bytes in the horizontal direction with a [146, 130, 17] Reed Solomon code. Thus, a parity of 16 bytes is generated. Errors of data blocks (shown in FIG. 12A) added to the individual lines of the two-dimensional array of 1040 bytes are corrected.

On the other hand, when the error correcting circuit 68b is selected, a two-dimensional array of data symbols of [16×130=2080] bytes shown in FIG. 12B are encoded for every 130 bytes in the horizontal direction with a [146, 130, 17] Reed Solomon code. Thus, a parity of 16 bytes is generated. Errors of data blocks (shown in FIG. 12B) added to the individual lines of the two-dimensional array of 2080 bytes are corrected as shown in FIG. 12B.

Data that is read from the memory 35 and that has been error-corrected is supplied to an output terminal 16.

Since the memory controlling circuit 37 and the selecting circuit 69 are controlled corresponding to the disc ID, the size of data blocks to be encoded with the error correction code can be changed.

FIG. 12A shows a block structure of a standard density type optical disc. A two-dimensional array of data symbols of (8×130=1040) bytes is encoded for every 130 bytes in the horizontal direction with the [146, 130, 17] Reed-Solomon code. Thus, a parity of 16 bytes is generated. Since (1040=1024+16) bytes, the amount of data symbols is around 1 kbytes. This Reed-Solomon code can correct an error of up to eight bytes in the same code sequence (146 bytes). Data is successively recorded on a data record medium such as an optical disc in the vertical direction. In the same order, data is reproduced. Thus, in the data structure shown in FIG. 12A, when a burst error of more than (8×8) bytes as represented by a hatched portion, the error cannot be corrected.

FIG. 12B shows a block structure of a high density type optical disc. A two-dimensional array of data symbols of (16×130=2080) bytes is encoded every 130 bytes in horizontal direction with the [146, 130, 17] Reed-Solomon code. Thus, a parity of 16 bytes is generated. Since (2080=2048+32) bytes, the amount of data symbols is around 2 kbytes. This Reed-Solomon code can correct an error of up to eight bytes in the same code sequence (146 bytes). In addition, data is successively recorded for a data record medium such as an optical disc in the vertical direction. Thus, in the data structure shown in FIG. 12B, as represented by a hatched portion, when a burst error of more than (16×8) bytes takes place, the error cannot be corrected.

When the block size is increased, the error-correction performance against a burst error can be improved. Thus, when the block size of the error correction code for a high density type optical disc is larger than that for a standard density type optical disc, the reliability of data can be improved.

Figure 13A:
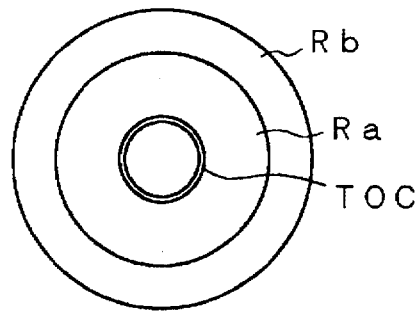
FIG. 13A is a schematic diagram for explaining an application of the present invention.

In addition, the present invention can be applied for the case in which the regions with different record densities are disposed in the same optical disc. As shown in FIG. 13A, when the record density of an outer peripheral region Rb is higher than the record density of an inner peripheral region Ra, it is defined that the interleave length (or the block size) of the error-correction-code encoding process for the region Ra is larger than that for the region Rb.

When a disc that is rotated at a constant angular velocity (CAV) and where digital data is accessed is used, the relative linear velocity for inner peripheral tracks accessed by the head is smaller than that for outer peripheral tracks. Thus, the record density on the inner peripheral side of the disc is inevitably higher than that of the outer peripheral side. In this case, a structure of which the interleave length (or block size) on the inner peripheral side is larger than that in the outer peripheral side is used.

In other words, since the record density on the inner peripheral side is higher than that on the outer peripheral side, the burst error length on the outer peripheral side is larger than that on the inner peripheral side. However, since a structure of which the interleave length (or block size) on the inner peripheral side becomes larger than that on the outer peripheral side is used, the burst error correcting performance on the inner peripheral side in which the burst error length is large can be enhanced.

On the other hand, since a structure of which the interleave length (or block size) on the outer peripheral side of which the record density is relatively low becomes smaller than that on the inner peripheral side is used, a data record prohibition region disposed before and after each rewritable unit data becomes small. Thus, in comparison with the structure of which the interleave length (or block size) for the inner peripheral side is used, the record density can be substantially increased.

Figure 13B:
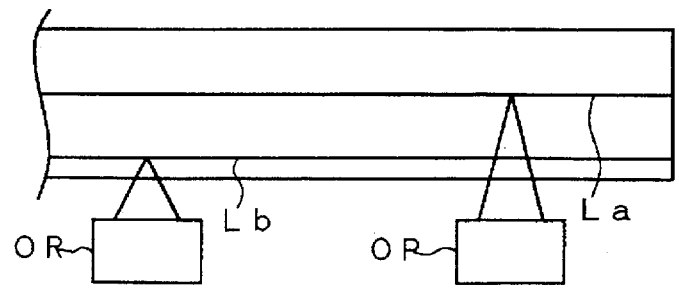
FIG. 13B is a schematic diagram for explaining an application of the present invention.

In addition, the present invention can be applied for the case that the record densities of individual layers of a multi-layered optical disc differ. As shown in FIG. 13B, in a multi-layered optical disc such as a two-layered optical disc, data record layers La and Lb are formed in the direction of the thickness of the disc. By focusing the optical pickup to each record layer, data is recorded/reproduced to and from each layer. When the record layer Lb disposed close to the read side has a higher record density than the record layer La, the error-correction-code encoding process can be switched for each record layer as described above.

According to the present invention, when record mediums have different record densities, since the burst error length or the block size for a high record density type record medium is larger than that for a high record density type record medium, a burst error of the high density type record medium can be corrected in the same manner as the standard density type record medium. Thus, the reliability as the data record medium can be improved. In addition, according to the present invention, a CVD disc and a disc drive that can record/reproduce data to and from discs with two different record densities can be accomplished. Moreover, a multi-session disc having regions with two different record densities can be accomplished.

Although the present invention has been shown and described with respect to best mode embodiments thereof, it should be understood by those skilled in the art that the foregoing and various other changes, omissions, and additions in the form and detail thereof may be made therein without departing from the spirit and scope of the present invention.

What is claimed is:

1. A digital data recording apparatus for recording digital data on a record medium, comprising:
   interleave means for interleaving the digital data with a first interleave length or a second interleave length that is larger than the first interleave length and forming interleaved digital data depending on whether record density information that represents the record density of the digital data on the record medium represents a first record density or a second record density that is larger than the first record density, respectively; and
   recording means for recording the interleaved digital data on the record medium.

2. The data recording apparatus as set forth in claim 1, wherein said interleave means comprises:
   first interleave processing means for interleaving the digital data with the first interleave length;
   second interleave processing means for interleaving the digital data with the second interleave length; and
   selecting means for selecting the output of said first interleave means or the output of said second interleave means as the interleaved digital data depending on whether the record density information represents the first record density or the second record density, respectively.

3. The digital data recording apparatus as set forth in claim 1, further comprising:
   record density input means for inputting the record density information.

4. The digital data recording apparatus as set forth in claim 1, further comprising:
   record density detecting means for detecting the record density information from the record medium.

5. A digital data reproducing apparatus, comprising:
   reading means for reading interleaved digital data from a record medium;
   record density detecting means for detecting the record density of the interleaved digital data and generating record density information; and
   deinterleave means for deinterleaving the interleaved digital data with a first interleave length or a second interleave length that is larger than the first interleave length and outputting digital data depending on whether the record density information represents a first record density or a second record density that is larger than the first record density, respectively.

6. The digital data reproducing apparatus as set forth in claim 5,
   wherein said record density detecting means is adapted for detecting the record density information through memory means disposed on the record medium.

7. The digital data reproducing apparatus as set forth in claim 5,
   wherein said record density detecting means is adapted for detecting the record density information from a reference information region included in the digital data of the record medium.

8. The digital data reproducing apparatus as set forth in claim 5,
   wherein said deinterleave means comprises:
      first deinterleave processing means for deinterleaving the interleaved digital data with the first interleave length;
      second deinterleave processing means for deinterleaving the interleaved digital data with the second interleave length; and
      selecting means for selecting the output of said first deinterleave processing means or the output of said second deinterleave processing means as the digital data depending on whether the record density information represents the first record density or the second record density, respectively.

9. A digital data recording method for recording digital data on a record medium, comprising the steps of:
   interleaving the digital data with a first interleave length or a second interleave length that is larger than the first interleave length and forming interleaved digital data depending on whether record density information that represents the record density of the digital data on the record medium represents a first record density or a second record density that is larger than the first record density, respectively; and
   recording the interleaved digital data on the record medium.

10. A digital data reproducing method, comprising the steps of:
   reading interleaved digital data from a record medium;
   detecting the record density of the interleaved digital data and generating record density information; and
   deinterleaving the interleaved digital data with a first interleave length or a second interleave length that is larger than the first interleave length and outputting digital data depending on whether the record density information represents a first record density or a second record density that is larger than the first record density, respectively.

11. A digital data recording apparatus, comprising:
  error-correction-code encoding means for error-correction-code encoding digital data for every block with a first data amount or a second data amount that is larger than the first data amount and forming error-correction-code encoded digital data depending on whether record density information that represents the record density of the digital data of a record medium represents a first record density or a second record density that is larger than the first record density, respectively; and
  recording means for recording the error-correction-code encoded digital data on the record medium.

12. The digital data recording apparatus as set forth in claim 11, wherein said error-correction-code encoding means comprises:
  first error-correction-code encoding processing means for error-correction-code encoding the digital data for every block with the first data amount;
  second error-correction-code encoding processing means for error-correction-code encoding the digital data for every block with the second data amount; and
  selecting means for selecting the output of said first error-correction-code encoding means or the output of said second error-correction-code encoding means as the digital data depending on whether the record density information represents the first record density or the second record density, respectively.

13. The digital data recording apparatus as set forth in claim 11, further comprising:
  record density input means for inputting the record density information.

14. The digital data recording apparatus as set forth in claim 11, further comprising:
  record density detecting means for detecting the record density information from the record medium.

15. A digital data reproducing apparatus, comprising:
  reading means for reading error-correction-code encoded digital data from a record medium; and
  error-correction-code decoding means for error-correction-code decoding the error-correction-code encoded data for every block with a first data amount or a second data amount that is larger than the first data amount and outputting digital data depending on whether record density information that represents the record density of the error-correction-code encoded digital data represents a first record density or a second record density that is larger than the first record density, respectively.

16. The digital data reproducing apparatus as set forth in claim 15,
  wherein said error-correction-code decoding means comprises:
  first error-correction-code decoding processing means for error-correction-code decoding the error-correction-code encoded digital data for every block with the first data amount;
  second error-correction-code decoding processing means for error-correction-code decoding the error-correction-code encoded digital data for every block with the second data amount; and
  selecting means for selecting the output of said first error-correction-code decoding means or the output of said second error-correction-code decoding means as the digital data depending on whether the record density information represents the first record density or the second record density, respectively.

17. A digital data recording method, comprising the steps of:
  error-correction-code encoding digital data for every block with a first data amount or a second data amount that is larger than the first data amount and forming error-correction-code encoded digital data depending on whether record density information that represents the record density of the digital data of a record medium represents a first record density or a second record density that is larger than the first record density, respectively; and
  recording the error-correction-code encoded digital data on the record medium.

18. A digital data reproducing method, comprising the steps of:
  reading error-correction-code encoded digital data from a record medium; and
  error-correction-code decoding the error-correction-code encoded data for every block with a first data amount or a second data amount that is larger than the first data amount and outputting digital data depending on whether record density information that represents the record density of the error-correction-code encoded digital data represents a first record density or a second record density that is larger than the first record density, respectively.

19. A disc shaped record medium that has a plurality of record tracks and that is rotated at a constant angular velocity when the tracks are accessed, the record medium including:
  first record tracks that record first digital data interleaved with a first interleave length; and
  second record tracks that record second digital data interleaved with a second interleave length larger than the first interleave length and that is disposed on a more inner peripheral side than the first record tracks.

20. A disc shaped record medium that has a plurality of record tracks and that is rotated at a constant angular velocity when the tracks are accessed, the record medium including:
  first record tracks that record first digital data error-correction-code encoded for every block with a first data amount; and
  second record tracks that record second digital data error-correction-code encoded for every block with a second data amount larger than the first data amount and that is disposed on a more inner peripheral side than the first record tracks.

21. A disc shaped record medium having at least two divided record regions as a first record region and a second record region defined as positions in a radial direction,
  wherein the first record region has recorded therein first digital data interleaved with a first interleave length; and
  wherein the second record region has recorded therein second digital data interleaved with a second interleave length larger than the first interleave length and that is disposed on a more inner peripheral side than the first record region.

22. A disc shaped record medium having at least two divided record regions as a first record region and a second record region defined as positions in a radial direction,
  wherein the first record region has recorded therein first digital data error-correction-code encoded for every block with a first data amount; and
  wherein the second record region has recorded therein second digital data error-correction-code encoded for every block with a second data amount larger than the first data amount and that is disposed on a more inner peripheral side than the first record region.

* * * * *